(12) United States Patent
Tenmyo

(10) Patent No.: US 6,827,467 B2
(45) Date of Patent: Dec. 7, 2004

(54) ILLUMINATING APPARATUS

(75) Inventor: Yoshiharu Tenmyo, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/358,675

(22) Filed: Feb. 5, 2003

(65) Prior Publication Data

US 2003/0156414 A1 Aug. 21, 2003

(30) Foreign Application Priority Data

Feb. 18, 2002 (JP) .......................... 2002/040662
Jul. 31, 2002 (JP) .......................... 2002/222375

(51) Int. Cl.[7] ................................. F21V 5/04
(52) U.S. Cl. ................. 362/268; 362/17; 362/560; 362/224; 362/277; 362/297; 362/309; 362/311; 362/319; 362/328; 362/331; 362/337
(58) Field of Search .................. 362/268, 3, 16, 362/17, 18, 30, 560, 223, 224, 277, 296, 297, 308, 311, 319, 327, 328, 331, 337, 309

(56) References Cited

U.S. PATENT DOCUMENTS 2,356,654 A * 8/1944 Cullman ..................... 362/223
5,055,976 A * 10/1991 Arai ............................. 362/17
5,408,395 A * 4/1995 Schmid et al. .............. 362/240
5,813,743 A * 9/1998 Naka ........................... 362/16
6,575,582 B2 * 6/2003 Tenmyo ....................... 362/16

FOREIGN PATENT DOCUMENTS

DE          4128995 A1 * 3/1993 ............. F21Q/1/00

* cited by examiner

Primary Examiner—Stephen Husar
Assistant Examiner—Sharon Payne
(74) Attorney, Agent, or Firm—Cowan, Liebowitz & Latman

(57) ABSTRACT

An illuminating apparatus having a light source, an optical unit disposed on the object side of the light source having a lens portion having positive refractive power in the central portion thereof, incidence surfaces on which light from the light source is incident and reflecting surfaces for totally reflecting the incident light, on both sides of the lens portion, and an emergence surface from which the light reflected by the reflecting surfaces emerges, wherein a beam emerging from the lens portion and a beam emerging from the emergence surface intersect with each other substantially at the same place in their condensed state, and a second optical unit having a plurality of prism portions, wherein the relative interval between the optical unit and the second optical unit are changed to vary an irradiation angle.

6 Claims, 16 Drawing Sheets

ILLUMINATING APPARATUS

BACKGROUND OF THE INVENTION

1. Field of the Invention

This invention relates to an illuminating apparatus, and particularly to an improvement in the optical characteristic of an illuminating apparatus narrowly limited in the opening area thereof, and a photographing apparatus provided with the illuminating apparatus.

2. Related Background Art

Regarding an illuminating apparatus used in a photographing apparatus such as a camera, various propositions have heretofore been made in order to cause beams emitted from a light source in various directions to be efficiently condensed within a necessary irradiation angle of view. Particularly in recent years, there has been proposed an illuminating apparatus in which instead of a Fresnel lens heretofore disposed in front of a light source, an optical member such as a prism or a light guide utilizing total reflection is disposed to thereby achieve an improvement in light condensing efficiency and the downsizing of the apparatus.

On the other hand, in an illuminating apparatus of a fixed irradiation range type, along with the higher magnification zoom of the photographing apparatus, illumination is effected to an unnecessary range in a telephoto state in which the irradiation range is narrow, and the loss of energy occurs, and in order to eliminate this phenomenon, there have been proposed such various illuminating apparatuses of a variable irradiation angle type as effect illumination corresponding to the conventional photographing range.

As the known technique of an illuminating system to which the technique as described above is applied, as is disclosed in the applicant's Japanese Patent Application Laid-Open No. 2001-66672 (U.S. Pat. No. 6,400,905), there is an illuminating apparatus which comprises an optical prism disposed forwardly of a light source for totally reflecting at least some of an incident beam and making all of it parallel to an optical axis, and first and second optical panels disposed on the object side of the optical prism, and in which the irradiation angle is varied by a change in the relative position of these two optical panels.

In photographing apparatuses such as cameras in recent years, the downsizing and lighter weight of the apparatus progress and on the other hand, the photo-taking lenses thereof are in a tendency toward higher magnification zoom. Generally, the photo-taking lenses of such photographing apparatuses tend to gradually become darker due to downsizing and higher magnifications, and when photographing is effected without the use of an auxiliary light source, there has been the possibility of hand vibration or the like adversely affecting the result of the photographing. From such a background, usually, an illuminating apparatus as an auxiliary light source is contained in a photographing apparatus such as a camera, but from the situation as described above, the frequency of use of the auxiliary illuminating apparatus has been greatly increased as compared with the prior art and the quantity of emitted light required for one shot has been in a tendency toward increase.

From such a tendency, in the above-mentioned Japanese Patent Application Laid-Open No. 2001-66672, the illuminating apparatus is comprised of an optical prism disposed forwardly of a light source for totally reflecting at least some of an incident beam and making all of it parallel to an optical axis, and first and second optical panels disposed on the object side of the optical prism, and the irradiation angle is adapted to be varied by a change in the relative position of the two optical panels.

In the illuminating apparatus of such a construction, however, there have been left the problems that three optical members are required in order to effect the condensing and diffusion of illuminating light and the number of parts becomes great, that the optical prism for constituting a condensing optical system becomes bulky and the general shape of the optical system becomes bulky, and that the positional accuracy of the arrangement of the many optical parts required becomes necessary and therefore the assembling work becomes complicated.

As described above, the conventional condensing optical system has suffered from problems in respect of arrangement space, the complicatedness of the assembling work, etc., and it is difficult to construct an optical system which can be made compact without the optical characteristic thereof being deteriorated. On the other hand, in such an illuminating apparatus wherein the irradiation angle is variable, it is true that when the optical system is located at a position corresponding to the telephoto side, it is necessary to effect illumination in its most condensed state, and unless all surfaces in the limited opening area are effectively utilized, the originally required guide number cannot be obtained. From this, it becomes a requisite task that the tasks of downsizing and improved optical characteristic are realized at a time.

SUMMARY OF THE INVENTION

The present invention has been made in view of such problems and has as its object to provide an illuminating apparatus of a simple construction which can efficiently utilize light from a light source and can contribute to space saving, and a photographing apparatus provided with the same.

So, one aspect of the present invention is an illuminating apparatus comprising:

a light source; and an optical unit disposed on the object side of the light source;

the optical unit being provided with a lens portion having positive refractive power in the central portion thereof, incidence surfaces on both sides of the lens portion on which light from the light source is incident, a reflecting surface for totally reflecting the light incident on the incidence surfaces, and an emergence surface from which the light reflected by the reflecting surface emerges;

wherein a beam emerging from the lens portion and a beam emerging from the emergence surface intersect with each other substantially at the same place in their condensed states.

The illuminating apparatus further comprises a second optical unit disposed on the object side of the optical unit, and the relative interval between the optical unit and the second optical unit is changed, and an irradiation angle is changed.

Also, the second optical unit is provided with a second lens portion having positive refractive power in the central portion thereof, and a plurality of prism portions having their convexity facing the object side on both sides of the second lens portion.

Also, the second optical unit is provided with a reflecting surface for totally reflecting some of a beam emerging from the optical unit by the side thereof, and directing it to the plurality of prism portions. The light reflected by the reflecting surface of the second optical unit and directed to the plurality of prism portions travels in a direction substantially parallel to the optical axis of the second optical unit.

When the angle formed by the optical axis side surface of the plurality of prism portions with respect to the optical axis is defined as θ, the following condition is satisfied:

$$10° \leq \theta \leq 35°$$

Also, the light source is a cylindrical light emitting tube, and the lens portion of the optical unit is of a cylindrical lens shape of which the lengthwise direction is the same direction as the lengthwise direction of the light emitting tube.

Also, the light source is a cylindrical light emitting tube, and the lens portion of the optical unit is of a cylindrical lens shape of which the lengthwise direction is the same direction as the lengthwise direction of the light emitting tube. The second lens portion of the second optical unit also is of a cylindrical lens shape of which the lengthwise direction is the same direction as the lengthwise direction of the light emitting tube. Further, the ridgeline of each of the prisms of the second optical unit is parallel to the lengthwise direction thereof.

Also, the light source is a cylindrical light emitting tube, and on the optical axis of the optical unit in a plane perpendicular to the lengthwise direction of the light emitting tube, the beam emerging from the lens portion and the beam emerging from the emergence surface intersect with each other in their condensed states.

Also, the illuminating apparatus further comprises a member disposed at a location on the light source which is opposed to the optical unit for reflecting the light from the light source.

Further features of the present invention will become apparent from the accompanying drawings and the following description.

DETAILED DESCRIPTION OF THE PREFERRED EMBODIMENTS

Figure 7:
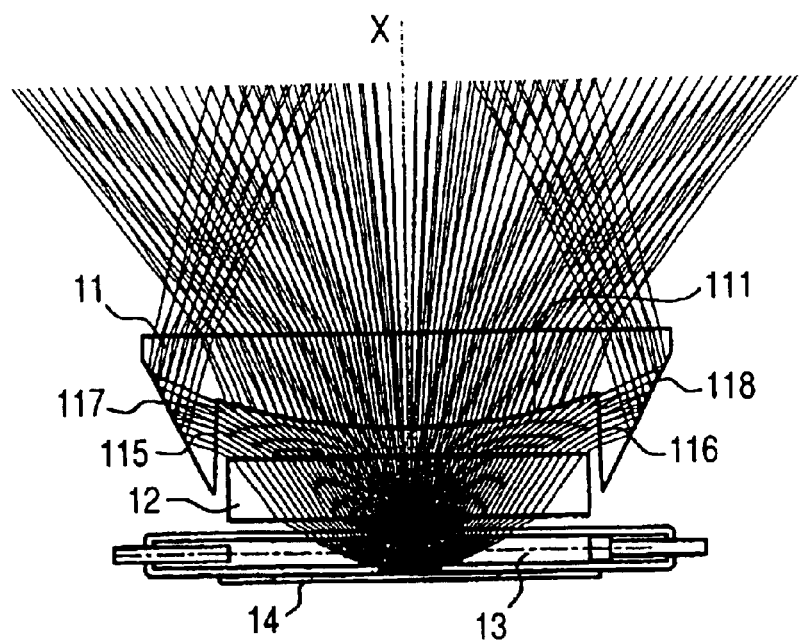
FIG. 7 is a cross-sectional view including the lengthwise direction of the discharge tube which shows the optical arrangement and the distribution of rays of light in the wide state of the illuminating apparatus.
Figure 8:
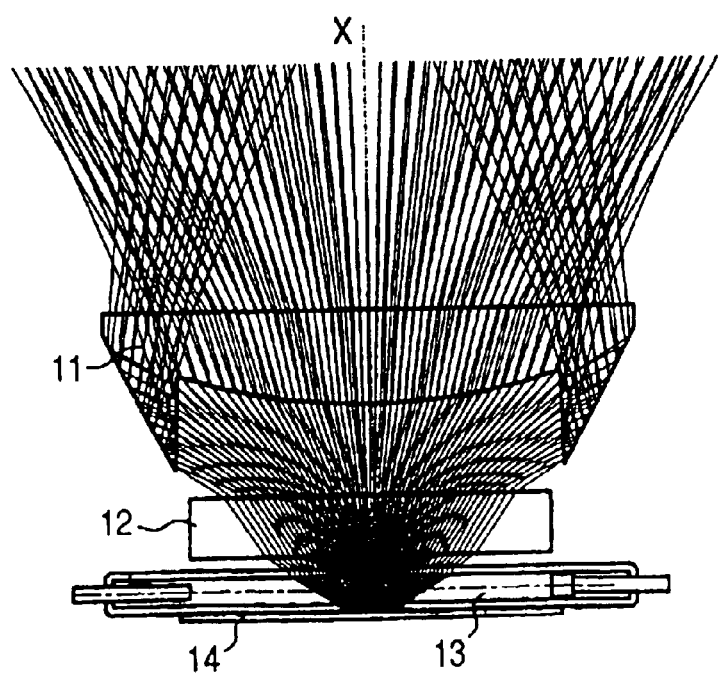
FIG. 8 is a cross-sectional view including the lengthwise direction of the discharge tube which shows the optical arrangement and the distribution of rays of light in the telephoto state of the illuminating apparatus.
Figure 9:
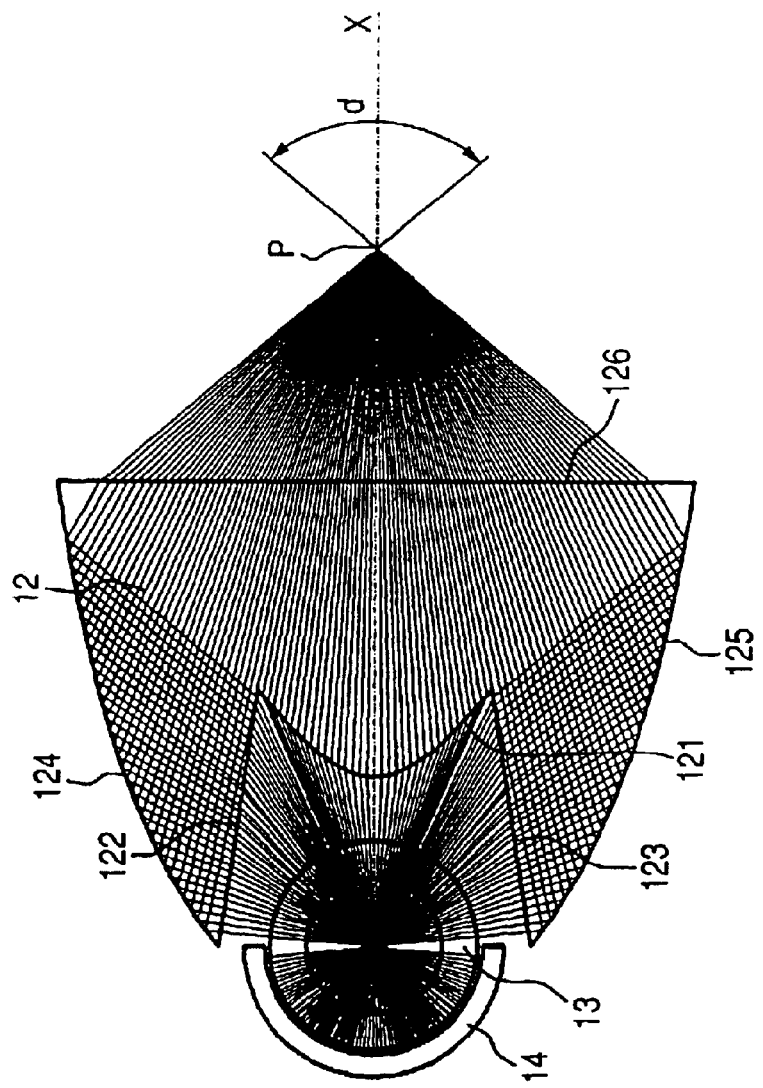
FIG. 9 is a cross-sectional view including the diametral direction of the discharge tube which shows the optical arrangement of the light source unit (the discharge tube, a reflector and an intermediate prism) of the illuminating apparatus and the distribution of rays of light.

FIGS. 1 to 14 show a strobo apparatus (illuminating apparatus) which is an embodiment of the present invention and the construction of a camera (photographing apparatus) carrying this strobo apparatus thereon. FIGS. 1 to 6 are vertical cross-sectional views (cross-sectional views including the diametral direction of a light source) of the optical system of the strobo apparatus, FIGS. 7 and 8 are horizontal cross-sectional views (cross-sectional views including the lengthwise center axis of the light source) of the optical system of the strobo apparatus, and FIG. 9 is a vertical cross-sectional view showing a portion of the optical system of the strobo apparatus.

Figure 10:
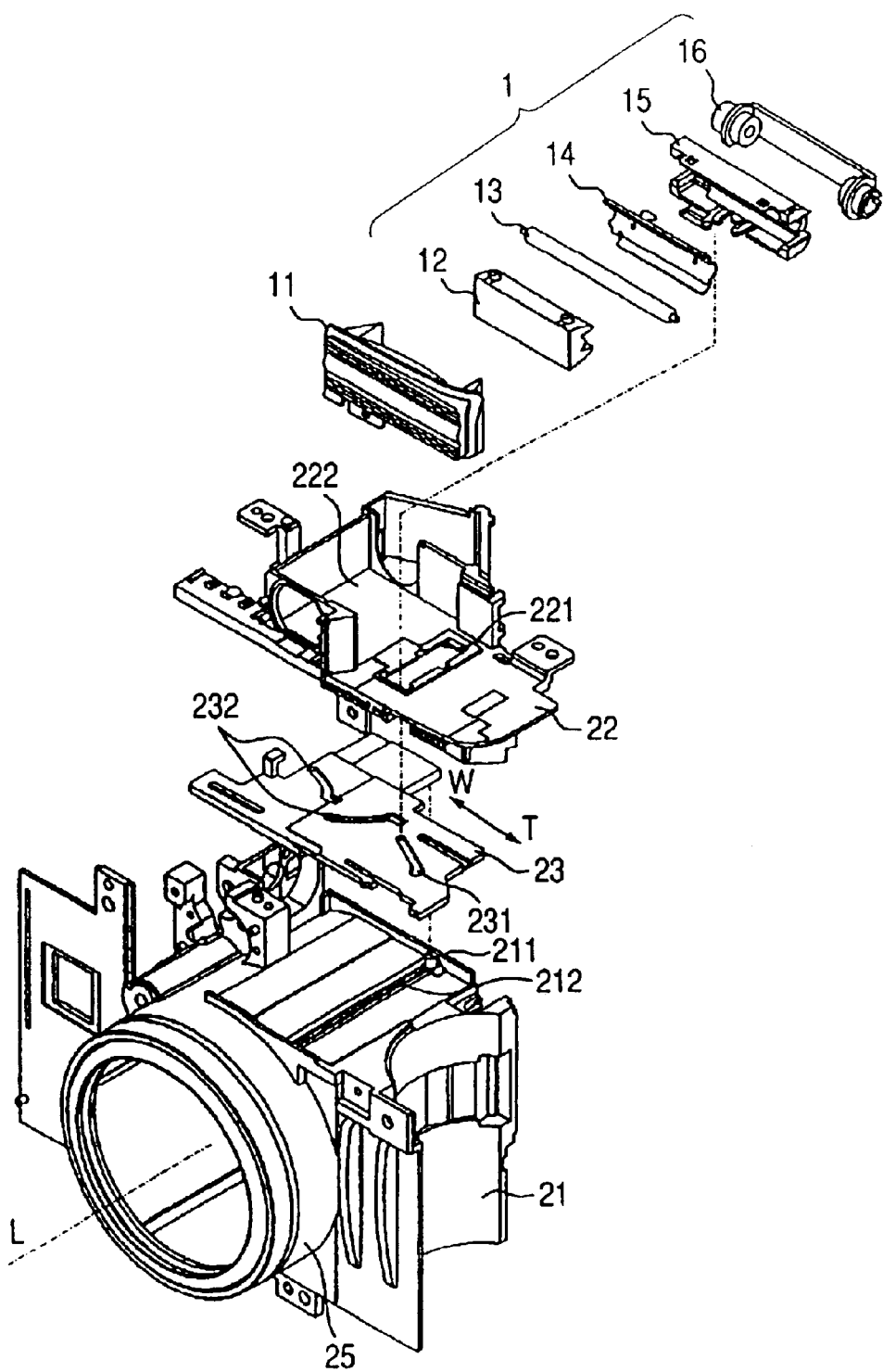
FIG. 10 is an exploded perspective view showing the constituent parts of a camera carrying the illuminating apparatus thereon.
Figure 11:
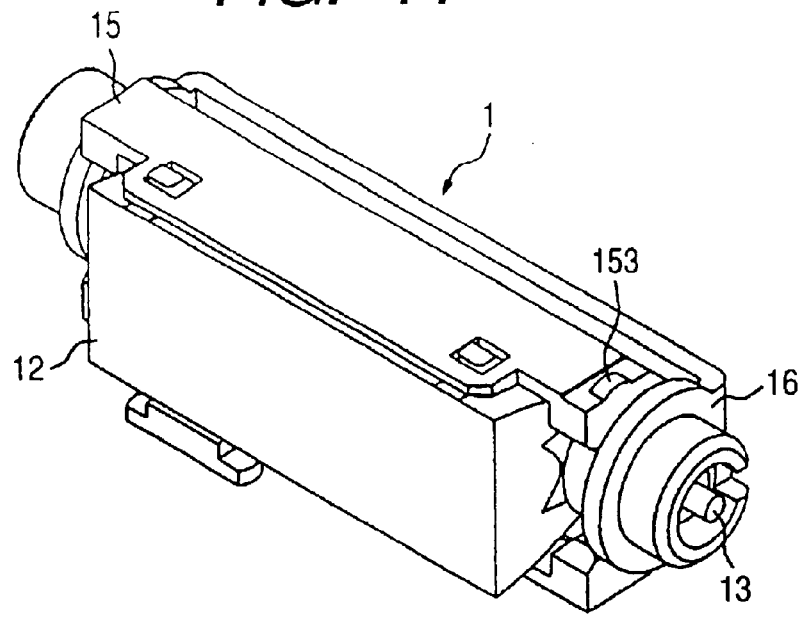
FIG. 11 is an upward perspective view showing the construction of the light source of the illuminating apparatus.
Figure 12:
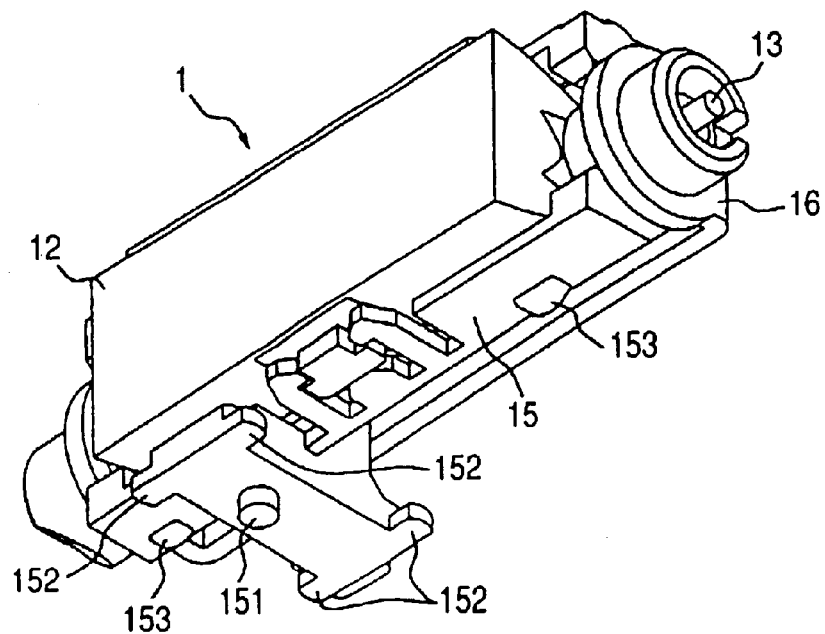
FIG. 12 is a downward perspective view showing the construction of the light source of the illuminating apparatus.

FIG. 10 is an exploded perspective view showing the interval structure of the camera carrying the strobo apparatus thereon, and FIGS. 11 and 12 are perspective views showing the assembled state of the strobo apparatus. Further, FIGS. 13 and 14 are perspective views showing the interval structure of the camera in its assembled state.

In FIGS. 1 to 9, there are also shown trace views of rays of light emitted from the center of the light source.

Figure 13:
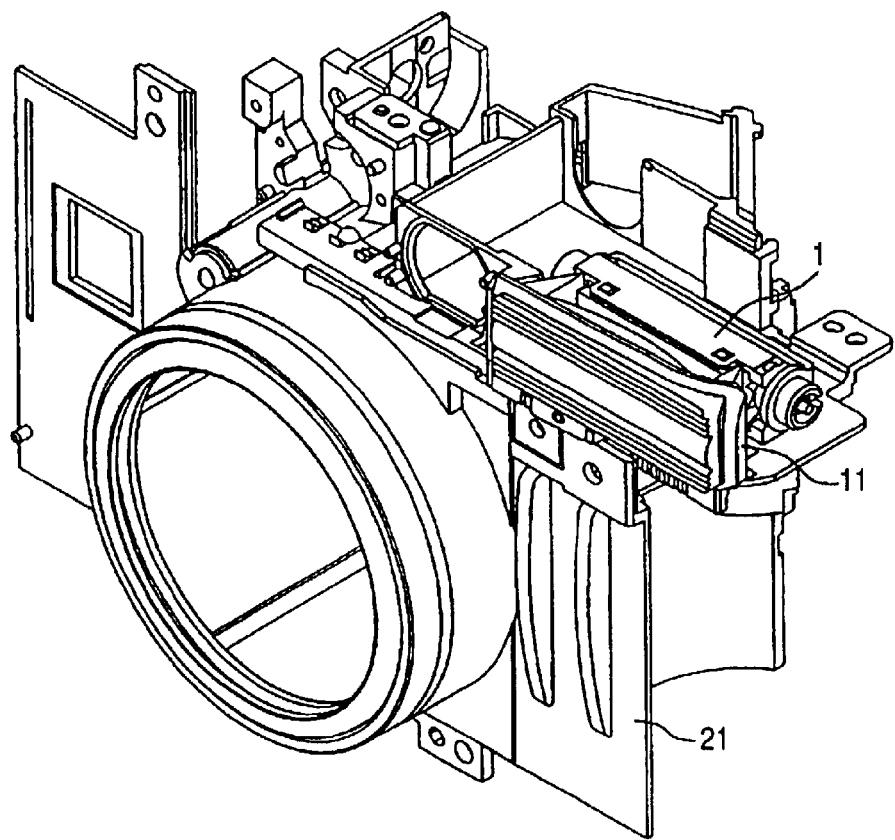
FIG. 13 is a perspective view showing the constituent parts of the camera (the wide state of a photo-taking lens) carrying the illuminating apparatus thereon in their assembled state.
Figure 14:
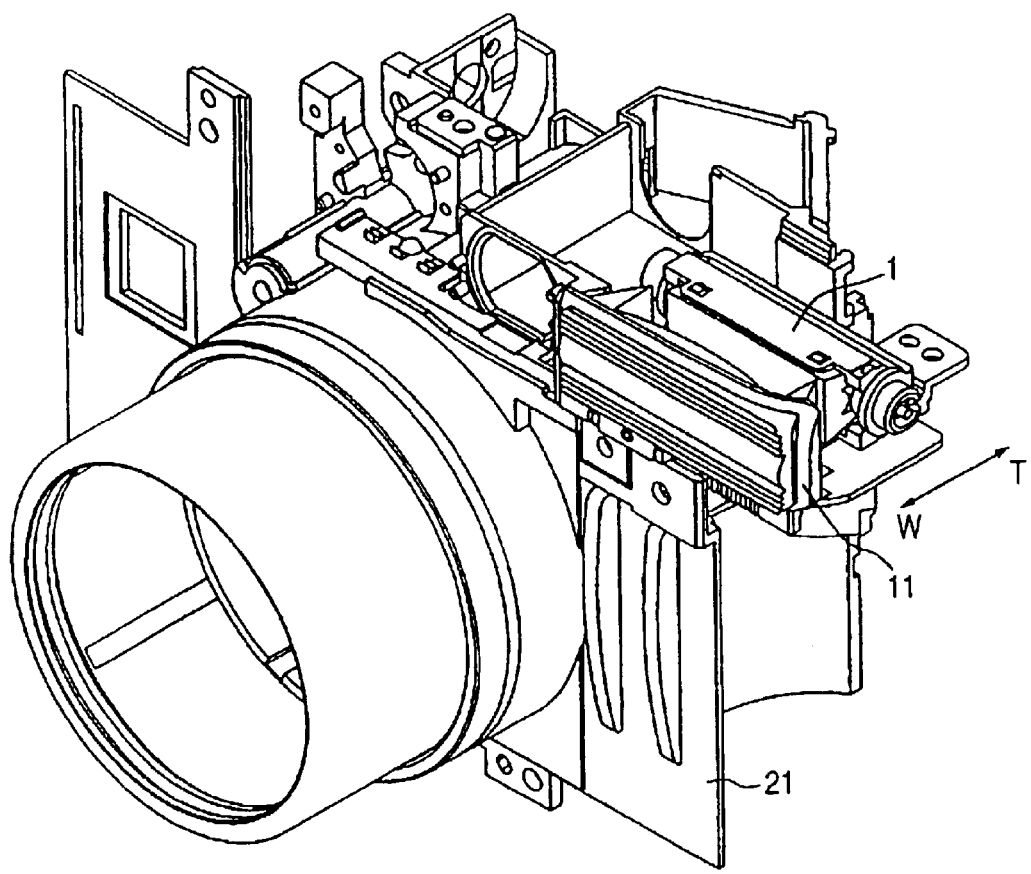
FIG. 14 is a perspective view showing the constituent parts of the camera (the telephoto state of the photo-taking lens) carrying the illuminating apparatus thereon in their assembled state.

As shown in FIGS. 13 and 14, the strobo apparatus according to the present embodiment is disposed on the upper portion of the main body 21 of the camera so as to be capable of effecting illumination on the object side.

When in FIG. 10, a photographing optical system provided in the lens barrel portion 25 of the main body 21 of the camera is moved in the direction of a photographing optical axis L (longitudinal direction) with the zooming operation, a rectilinear pin 211 provided on a part constituting the driving mechanism of this photographing optical system is moved in the longitudinal direction along a rectilinear groove 212 formed in the upper surface of the lens barrel portion 25.

A cam plate 23 is disposed above the lens barrel portion 25, and the underside of this cam plate 23 is formed with a driving cam, not shown, engaged by the rectilinear pin 211. Therefore, when the rectilinear pin 211 is moved in the longitudinal direction, the cam plate 23 is moved in the right and left direction (a horizontal direction substantially orthogonal to the photographing optical axis L) as viewed in FIG. 10.

Also, the cam plate 23 is formed with a strobo driving cam 231 and a finder driving cam 232. The strobo driving cam 231 is engaged by a cam pin (151 in FIG. 12) provided on the main body 15 of a light source unit constituting the strobo apparatus, and the finder driving cam 232 is engaged by a cam pin provided on a lens forming a portion of a finder optical system (not shown) contained and held in the finder containing portion 222 of a finder ground plate 22 fixed to the main body 21 of the camera. Therefore, when the cam plate 23 is moved in the right and left direction, the lens of the finder optical system is moved in a direction substantially parallel to the photographing optical axis L (the right and left direction) and the main body 15 of the light source unit is moved in the direction of an optical axis X substantially parallel to the photographing optical axis L, whereby the strobo zooming operation and the finder zooming operation are performed.

In FIG. 10, the strobo apparatus is comprised of a front optical element (second optical member) 11, an intermediate prism (first optical member) 12, a discharge tube 13, a reflector 14, the main body 15 of the light source unit and a presser rubber 16. The front optical element 11 is fixed as an irradiation window for strobo light to the finder ground plate 22. The discharge tube 13 and the reflector 14 disposed on the rear side of this discharge tube 13 are fixed to the main body 15 of the light source unit by the presser rubber 16, and the intermediate 12 is disposed on the front side of the discharge tube 13 and is fixed to the main body 15 of the light source unit.

The discharge tube 13 is connected to a power supply circuit (not shown) of the main body 21 side of the camera through a lead wire, not shown, and emits light as a light source. The reflector 14 reflects the light emitted rearwardly from the discharge tube 13 and returns it to the discharge tube 13 side. The discharge tube 13 is pressed against the reflector 14 by the elastic force of the presser rubber 16. The light source unit 1 is constituted by the intermediate prism 12, the discharge tube 13, the reflector 14 and the main body 15 of the light source unit.

As previously described, the light source unit (the intermediate prism 12, the discharge tube 13 and the reflector 14) 1 is moved relative to the front optical element 11 integrally therewith in the longitudinal direction by the cam action of the cam pin 151 provided on the main body 15 of the light source unit and the strobo driving cam 231 formed on the cam plate 23. Thereby, the interval between the front optical element 11 and the intermediate prism 12 is changed and the degree of condensing or divergence of the light emitted from the discharge tube 13 is changed, and the irradiation range of the strobo light is changed with the zooming operation of a photo-taking lens.

FIG. 12 is a view of the light source unit 1 as it is seen from below it. The cam pin 151 engageable with the strobo driving cam 231 and a guide projection 152 are formed on the underside of the main body 15 of the light source unit integrally with the main body 15 of the light source unit. The guide projection 152 is for being engaged with a rail 221 formed on the finder ground plate 22 shown in FIG. 10.

Further, as shown in FIGS. 11 and 12, sliding projections 153 are formed on the upper and lower surfaces of the main body 15 of the light source unit integrally with the main body 15 of the light source unit. These sliding projections 153 slide relative to the finder ground plate 22 and an upper cover (not shown) attached to the upper surface thereof when the light source unit 1 is moved back and forth, and suppress the vertical shake of the light source unit 1 and makes the smooth movement thereof possible.

The member contacting with these sliding projections 153 need not always be the finder ground plate 22, but may be, for example, the exterior member of the camera.

FIG. 13 shows the wide state of the photo-taking lens, and FIG. 14 shows the telephoto state of the photo-taking lens. As shown in these figures, in the wide state, the front optical element 11 and the intermediate prism 12 become closest to each other, and in the telephoto state, the front optical element 11 and the intermediate prism 12 become farthest from each other. The irradiation range of the light emitted from the discharge tube 13 is changed by any change in the relative position of the front optical element 11 and the intermediate prism 12 in the direction of the optical axis between the wise state and the telephoto state.

The operation and optical action of the strobo apparatus will now be described in greater detail with reference to FIGS. 1 to 9.

In these figures, the discharge tube 13 is a xenon tube having a cylindrical shape, and is disposed so as to extend in a direction substantially orthogonal to the optical axis X (here, a substantially horizontal direction). The reflector 14 is for reflecting a rearwardly emitted component of the beam emitted from the discharge tube 13 forwardly (to the object side), and a metallic material such as brilliant aluminum having a high reflectance is used for the reflecting surface thereof, or a metal vapor-deposited surface of a high reflectance is formed on the reflecting surface thereof.

The intermediate prism 12 as a first optical member is an optical member for causing the beam from the discharge tube 13 to be condensed substantially on the optical axis in a cross section including the diametral direction of the discharge tube 13, and controlling it to a predetermined light distribution characteristic.

Figure 1:
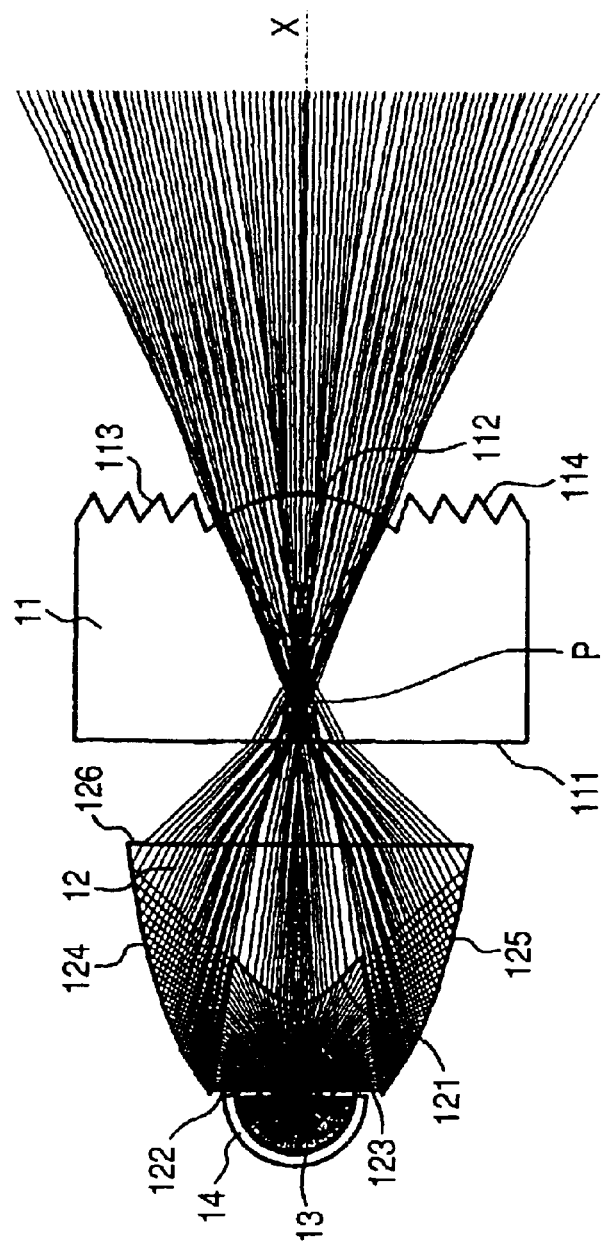
FIG. 1 is a cross-sectional view including the diametral direction of a discharge tube which shows the optical arrangement and the distribution of rays of light in the wide state of an illuminating apparatus which is an embodiment of the present invention.
Figure 2:
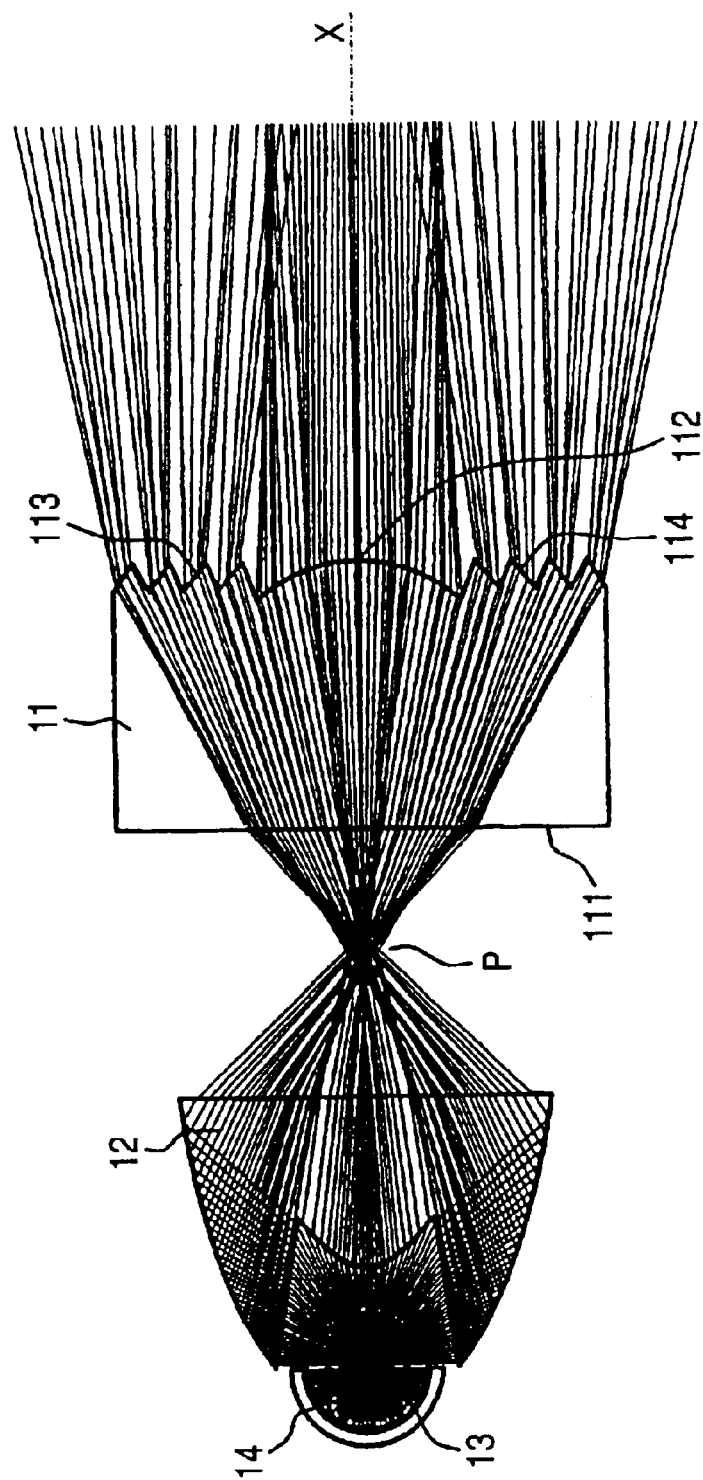
FIG. 2 is a cross-sectional view including the diametral direction of the discharge tube which shows the optical arrangement and the distribution of rays of light in the telephoto state of the illuminating apparatus.

Also, the front optical element 11 as a second optical member is disposed forwardly of the intermediate prism 12, and as shown in FIGS. 7 and 8, on the light source side incidence surface thereof, there is formed a cylindrical lens portion 111 having refractive power in the lengthwise direction of the discharge tube 13. Also, near the central portion of the optical axis an emergence surface which is the object side of the front optical element 11, as shown in FIGS. 1 and 2, there is formed a cylindrical lens portion (positive lens portion) 112 having positive refractive power in a vertical direction, and on upper and lower peripheral portions sandwiching the cylindrical lens portion 112 therebetween, there are formed prism-shaped Fresnel lens portions 113 and 114 including first and second Fresnel lens surfaces (which will be described later) imparting the condensing action to a beam from a condensing area by the intermediate prism 12.

An optical resin material of a high transmittance such as acrylic resin is preferable as the material of the front optical element 11 and the intermediate prism 12.

The illuminating apparatus according to the present embodiment constructed as described above is such that the positional relation (interval) between the light source unit 1 (particularly the intermediate prism 12) and the front optical element 11 in the direction of the optical axis is changed to thereby change the irradiation range in the vertical direction and the right and left direction so as to correspond to the focal length of the photo-taking lens (i.e., the angle of view) for which the zooming operation is possible.

The setting of an optimum shape for effecting a change in the irradiation range in the vertical direction will hereinafter be described with reference to FIGS. 1 and 2.

In FIGS. 1 and 2, reference characters given to respective portions correspond to those in FIGS. 3 to 14.

The reflector 14 has the shape of its reflecting surface made into a semicylindrical shape substantially concentric with the discharge tube 13. This is a shape effective to return the reflected light by the reflector 14 to the vicinity of the central portion of the discharge tube 13. Thereby, it is made difficult to be adversely affected by the refraction of the glass of the discharge tube 13 and also, it becomes possible to handle the light directly incident from the discharge tube 14 onto the intermediate prism 12 and the light via the reflection by the reflector 14 as emergent lights from substantially the same point (the central point), and it becomes possible to downsize the whole of an optical system subsequent thereto.

FIG. 9 is a view for illustrating the basic way of view for the optical system, and shows the detailed shape of the diametral cross-section of the discharge tube 13, the reflector 14 and the intermediate prism 12 together with a ray trace view about a beam emitted from the central portion of the discharge tube 13.

In this diametral cross section, near the central portion of the optical axis in the light source side incidence portion of the intermediate prism 12, there is formed an aspherical cylindrical lens portion 121 (a positive lens portion) having positive refractive power. Also, in upper and lower peripheral portions sandwiching this cylindrical lens portion 121 therebetween, there are formed flat peripheral incidence surfaces 122 and 123. Further, reflecting surfaces 124 and 125 having an aspherical shape are formed above the peripheral incidence surface 122 and below the peripheral incidence surface 123, respectively. The cylindrical lens portion 121 and the reflecting surfaces 124, 125 have a shape which causes the beam emitted from the discharge tube 13 to be condensed substantially toward a point P on the optical axis X (condensed (converged) on a condensing area substantially on the optical axis) in the diametral direction of the light source, whereby it becomes possible to stop down the expanse angle of the beam forwardly diverging from the condensing point P into a predetermined angle α. The emergence surface 126 of the intermediate prism 12 which is the object side thereof is formed into a flat surface.

The optical action of this intermediate prism 12 in the vertical direction thereof will hereinafter be described in greater detail. First, of the beam forwardly emitted from the vicinity of the central portion of the discharge tube 13, a component having a small angle with respect to the optical axis is directly incident on the cylindrical lens portion 121. This beam emerges from the emergence surface 126 of the intermediate prism 12 by the positive refractive power of the cylindrical lens portion 121, and thereafter is condensed on the condensing area near the point P.

Also, of the beam emitted from the vicinity of the central portion of the discharge tube 13, a component having a relatively great angle with respect to the optical axis is refracted by the refracting surfaces (incidence surfaces) 122 and 123, and then enters the intermediate prism 12, and travels toward the reflecting surfaces 124 and 125. The reflecting surfaces 124 and 125 are formed into a shape which satisfies a total reflection condition for the beam incident from the refracting surfaces 122 and 123 and therefore, substantially all of the beam incident from the reflecting surfaces 124 and 125 is reflected. Further, by the shape of the reflecting surfaces 124 and 125, the beam reflected thereby is condensed on substantially the same area as the condensing area by the refractive power of the cylindrical lens portion 121. On the other hand, the beam travelling from the center of the discharge tube 13 toward the reflector 14 rearward thereof is returned to the center of the discharge tube 13 because as previously described, the shape of the reflecting surface of the reflector 14 is a semicylindrical surface concentric with the discharge tube 13, and follows substantially the same optical path to the direct incident light onto the intermediate prism 12, and is condensed near the point P.

As described above, the beams emitted from the center of the discharge tube 13 are all condensed near the point P. Also, at this time, the divergence angle range of the beams after condensed is suppressed to the angle α, and it is possible to convert them into a beam easy to handle in an optical system which will hereinafter be described.

Now, the peripheral incidence surfaces 122 and 123 of the intermediate prism 12 are constituted by flat surfaces having a relatively great angle with respect to the optical axis. This, as can be seen from the shown optical path, is for preventing the beams reflected by the reflecting surfaces 124 and 125 from being unnecessarily reflected by these peripheral incidence surfaces 122 and 123 when they travel toward the condensing point P, and enabling them to be efficiently directed to the emergence surface 126 side.

The angle of the peripheral incidence surfaces 122 and 123 should desirably be set so as to substantially coincide with the angle of the rays of light reflected by the rearmost portions of the reflecting surfaces 124 and 125 with respect to the optical axis, and this is an ideal angle for making the loss of the quantity of light smallest.

By setting the shape of each optical surface of the intermediate prism 12 as described above, the beams emitted from the discharge tube 13 toward all the surroundings thereof can be converted into a beam of an angle range α emerging substantially from one point P (condensing area).

Moreover, in spite of the optical path control by each optical surface of the intermediate prism 12 being effected by the use of two kinds of optical action, i.e., refraction and reflection, there can be obtained a light distribution characteristic which has a small change in characteristic in the boundary area between the optical paths of refracted light and reflected light and which is substantially continuous in the boundary area.

A change in the irradiation range utilizing the above-described condensing onto the condensing area will now be described with reference to FIGS. 1 and 2.

FIG. 1 shows the optical arrangement of the strobo apparatus corresponding to the time when the photo-taking lens is in the wide state. This state will hereinafter be referred to as the wise state with regard also to the strobo apparatus. As shown in this figure, in the wide state, the front optical element 11 and the intermediate prism 12 are closest to each other. In this state, the condensing area by the intermediate prism 12 and the position of the incidence surface 111 of the front optical element 11 substantially coincide with each other.

However, the optimum positional relationship between the condensing point P and the incidence surface of the front optical element 11 is suitably varied by the relation with the focal length required of the photo-taking lens.

The shape of the front optical element 11 will be described in detail here. The incidence surface 111 of the front optical element 11 is not given a lens effect with respect to the vertical direction, and this surface is utilized for the condensing in the lengthwise direction of the discharge tube 13, as previously mentioned and as will be described in detail later.

On the other hand, the emergence surface side of the front optical element 11 is set to various shapes for giving a condensing effect thereto.

First, near the central portion of the optical axis, there is formed an aspherical cylindrical lens portion 112 extending in a direction perpendicular to the plane of the drawing sheet of FIG. 1, and this cylindrical lens portion 112 is a positive lens having positive refractive power in the vertical direction in the cross section of this figure. Also, in the upper and lower peripheral portions, there are formed Fresnel lens portions 113 and 114 for imparting refracting action to a beam incident in the vertical direction in the cross section of this figure. Here, the Fresnel lens portion 113 has a first Fresnel lens surface 113a and a second Fresnel lens surface 113b, and the Fresnel lens portion 114 has a first Fresnel lens surface 114a and a second Fresnel lens surface 114b (see FIG. 3). The details of these first and second Fresnel lens surfaces will be described later.

Description will now be made of the optical action of the front optical element 11 constructed as descried above. As shown in FIG. 1, in the wise state, substantially all of the beams emitted from the center of the discharge tube 13 emerge from the cylindrical lens portion 112 formed on the central portion of the emergence surface of the front optical element 11. Generally the light distribution characteristic in the wide state is most liable to cause uneven light distribution, but in the present embodiment, design is made such that all the applied beams in the wise state are light-distribution-controlled by the continuous-aspherical shape of the cylindrical lens portion 112, whereby uneven light distribution caused by a discontinuous shape is eliminated to the utmost so that a substantially uniform light distribution characteristic can be obtained.

Also, in this wide state, the distance between the cylindrical lens portion 112 and the condensing area by the intermediate prism 12 is short and therefore, the condensing effect is weak and the application of the strobo light to a relatively wide range can be accomplished.

On the other hand, FIG. 2 shows the optical arrangement of the strobo apparatus corresponding to the time when the photo-taking lens is in the telephoto state. This state will hereinafter be referred to as the telephoto state with regard also to the strobo apparatus.

As shown in FIG. 2, the beam emitted from the center of the discharge tube 13 and condensed by the intermediate prism 12 is condensed on the condensing area, and thereafter widens sufficiently and is directed to substantially the whole of the emergence surface of the front optical element 11. Then, the beam is condensed within a very narrow angle range by the optical action of the cylindrical lens portion 112 formed on the emergence surface and the Fresnel lens portions 113, 114.

The shape of the Fresnel lens portions in the present embodiment, unlike the conventional Fresnel lens, is a form in which efficient condensing heretofore not experienced is effected in this telephoto state.

This characteristic shape in the present embodiment will hereinafter be described in greater detail with reference to FIGS. 3 to 6.

Figure 3:
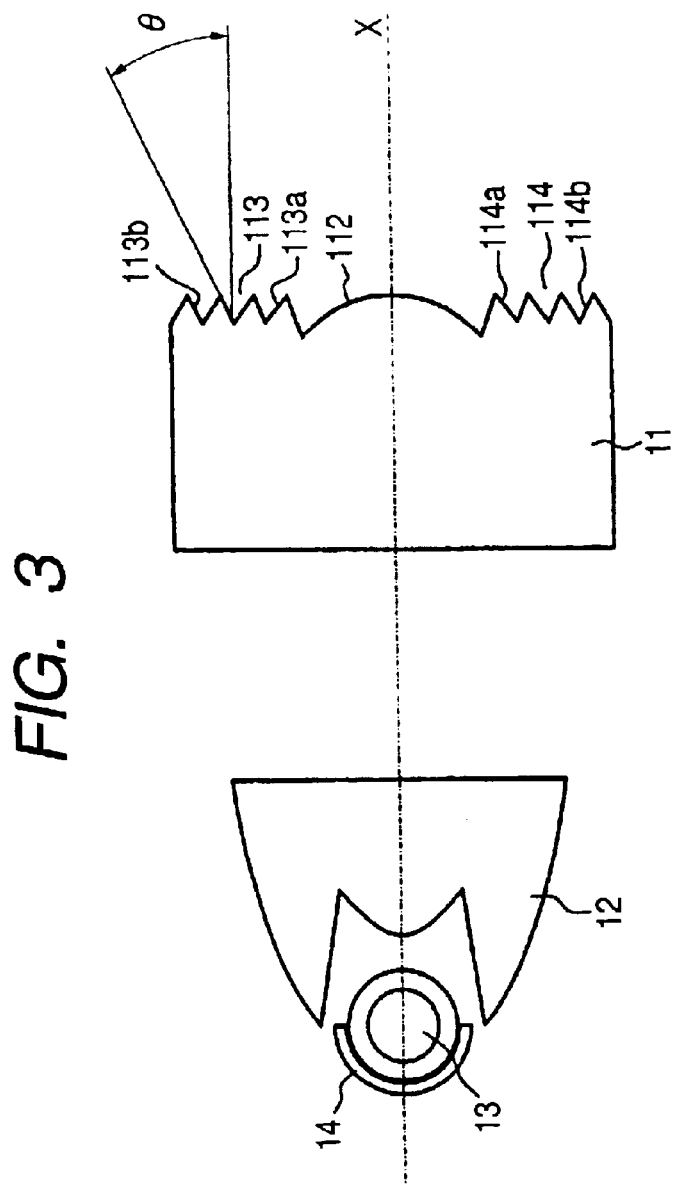
FIG. 3 is a view for illustrating a vertical cross-sectional shape in the telephoto state of the illuminating apparatus.

FIG. 3 is a view for illustrating the way of view for the vertical cross-sectional shape in the telephoto state. As shown, it will be seen that in the Fresnel lens portions formed in the present embodiment, the inclination of the surfaces (the second Fresnel lens surfaces 113b, 114b) connecting the surfaces (the first Fresnel lens surfaces 113a, 114a) usually functioning as Fresnel lenses, i.e., the angle θ formed by that surface of the Fresnel lens which is near to the optical axis X with respect to the optical axis X, is set to a very great angle as compared with that of the conventional Fresnel lens. Originally, it is usual to set the inclination of the second Fresnel lens surfaces so as to be made small to the utmost (so as to make θ small) in order to increase the effective areas of the first Fresnel lens surfaces, and is often set to a value of the order of draw taper of about 2° to 4° which becomes necessary in molding. However, when in the Fresnel lens portion according to the present embodiment, the angle of inclination of the second Fresnel lens surfaces to set to such a small angle, it will sometimes become a cause which rather falls the efficiency of illumination.

This is for the following reason. As a feature of the illuminating apparatus according to the present embodiment, mention may be made of the fact that the beam emitted from the light source is once condensed on the condensing area. As regards a condensing lens for refracting the beam emerging from the condensing area in this manner, unless the beam is refracted by a lens of a very strong refractive index, the beam will assume a distribution expanding to a certain extent with respect to the optical axis even after refracted in the Fresnel lens portion. In this case, if the Fresnel lens surfaces are formed on the irradiated surface side, there will arise the problem that the beam emerging into a space after it is refracted in the first Fresnel lens surface is again incident from the adjacent second Fresnel lens surface and there is created a beam emerging in a direction entirely differing from the direction in which it is to be applied. As a construction for preventing the reincidence from the second Fresnel lens surface, a method of setting the second Fresnel lens surface so as to have a predetermined inclination with respect to the optical axis is effective. This angle setting differs depending the required irradiation range, but may preferably be in the following angle range:

$$10° \leq \theta \leq 35°$$

Here, 10° which is the minimum value of the above-mentioned range is a minimum angle necessary to prevent a decrease in the effective beam on the irradiated surface which as described above, occurs when the escape (the angle of inclination with respect to the optical axis) of the second Fresnel lens surface becomes null. On the other hand, when the angle of inclination is too great, the lens area which functions as an original Fresnel lens decreases and the original function as a lens is deteriorated and therefore, the maximum value 35° is a maximum allowable angle set with this point taken into account.

Namely, the light from the light source can be efficiently utilized without the incidence of the beam after condensed on the condensing area onto the first Fresnel lens surface being hampered. That is, as described above, the second Fresnel lens surface is inclined with respect to the optical axis, to thereby secure the optical path when the beam is incident on the first Fresnel lens surface.

For the reason as set forth above, in the present invention, the second Fresnel lens surface is inclined by a predetermined angle with respect to the optical axis. Particularly, in the present embodiment, the angle of the second Fresnel lens nearest to the center of the optical axis is set to 20°, and the angle of the second lens surface farthest from the center of the optical axis is set to 30°, and with these angles as the minimum and the maximum, respectively, the angle is set so as to gradually become greater from the central portion toward the peripheral portion, and both angles are set so as to assume values within the above-mentioned angle range.

On the other hand, the adoption of the construction of the Fresnel lens as described above gives rise to a new problem. That is, by giving the inclination as described above to the second Fresnel lens surfaces, the effective area of the first Fresnel lenses surfaces is decreased and the illuminance of the vicinity of the central portion on the irradiated surface is reduced. In the present invention, this reduction in the illuminance of the vicinity of the central portion on the irradiated surface is made up for by using the above-described shape of the Fresnel lens and adapting a countermeasure as shown below.

Figure 4:
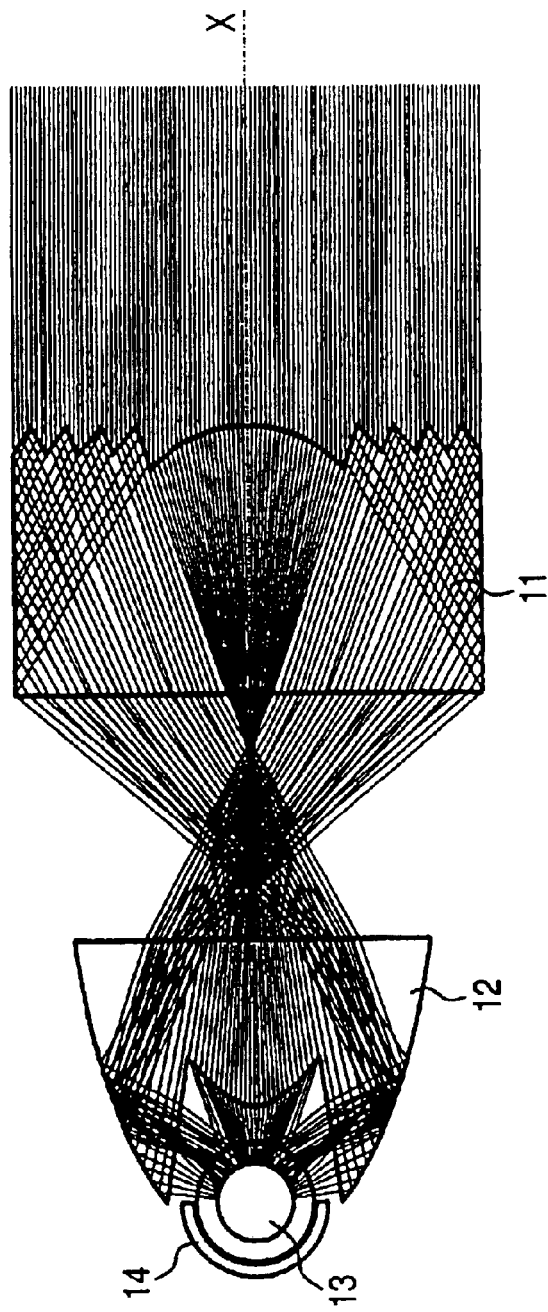
FIG. 4 is a cross-sectional view including the diametral direction of the discharge tube which shows the optical arrangement and the distribution of the rays of light of a beam travelling in a direction substantially parallel to an optical axis in the telephoto state of the illuminating apparatus.

First, FIG. 4 shows the same cross-sectional view as that of FIG. 3 and moreover, shows the manner in which the beam travelling toward the center of the optical axis reaches the interior of the light source by the use of which part of the front optical element 11. In the optical system shown in FIG. 4, it will be seen that there exist effective beams emerging from all areas of the emergence surface of the front optical element 11 substantially in parallelism to the optical axis. From this, it will be seen that in spite of the Fresnel lens being used, effective irradiation can be realized form the area of all Fresnel lens surfaces including the second Fresnel lens surfaces.

There is a method of improving the problem of the number of parts in the conventional illuminating apparatus by adopting a construction in which a Fresnel lens usually often used on the appearance portion of an optical apparatus is formed on the emergence surface side, but this construction suffers from various problems.

When a Fresnel lens is used, great refractive power is obtained and also the bull length of the optical system can be shortened, whereas if an attempt is made to give a condensing effect equal to that of a convex lens surface suffering little from the loss of energy, there will arise the problem that a large opening area becomes necessary as the emergence surface. Particularly, when a construction using such a Fresnel lens is applied to such an optical system that the opening area is limited to a predetermined size, there is generally the tendency that the optical characteristic is reduced.

Figure 18:
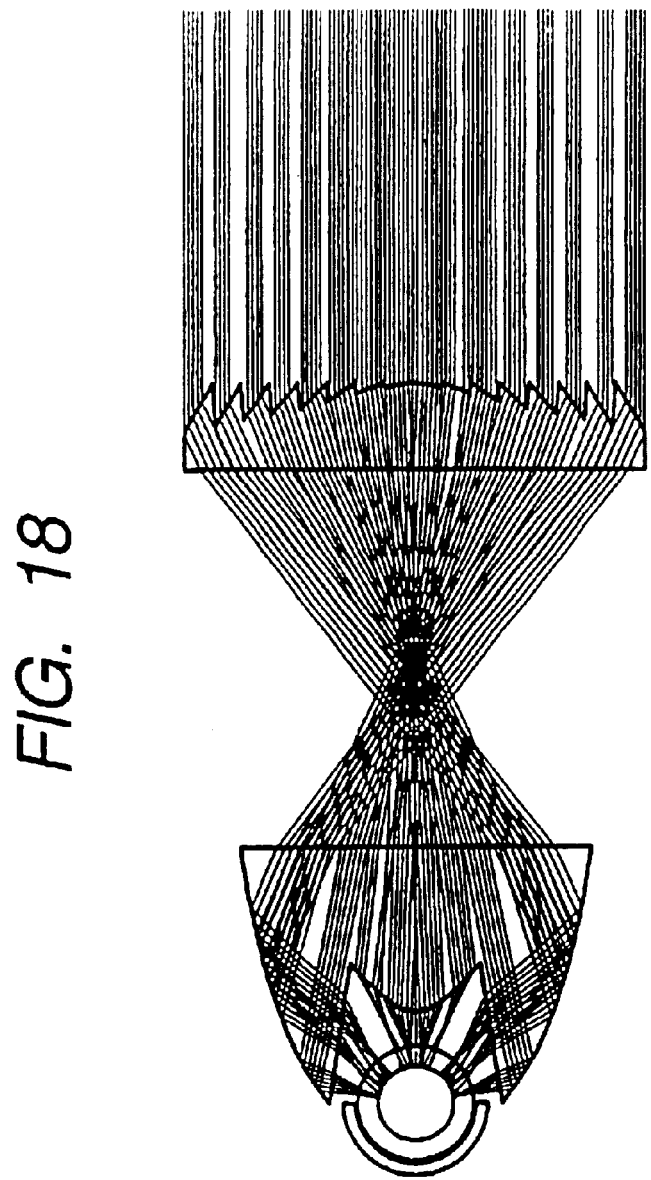
FIG. 18 is a view for illustrating another example of the cross-sectional shape of the emergence surface side of the front optical element 11.

The details of this construction are shown in FIG. 18. In the case of the construction as shown (i.e., a construction in which the second Fresnel lens surfaces in the present embodiment are not inclined with respect to the optical axis), the condensing action can be given by the use of a Fresnel lens to thereby contribute to the shortening of the full length of the optical system in the direction of the optical axis thereof. On the other hand, from a ray trace view in FIG. 18, it will also be seen that all areas of the emergence surface of the lens portion do not effectively function as an optical system. That is, it will be seen that a portion (edge portion) corresponding to a second Fresnel lens surface linking Fresnel lens surfaces functioning as a lens (the first Fresnel lens surfaces in the present embodiment) together becomes as obstacle and causes a discontinuous point, and near this portion which becomes the obstacle, there is not a beam emerging in the direction of the optical axis. Also, it will be seen that an effective beam emerging substantially in parallelism to the optical axis tends to gradually decrease away from the central portion of the lens.

To shorten the full length of the optical system as described above, a countermeasure method of simply forming a Fresnel lens on the emergence surface side of the optical system is insufficient, and it is not impossible to achieve an increase in the quantity of emerging light corresponding to an increase in the opening area of the emergence surface. In the optical system according to the present embodiment, there is formed a discrete reflecting optical path which does not exist in such a construction in which a Fresnel lens is simply formed on the emergence surface side of the optical system, and the problem which will arise in a construction wherein a Fresnel lens is simply provided does not arise.

This state will be described in greater detail with reference to FIGS. 5 and 6.

Figure 5:
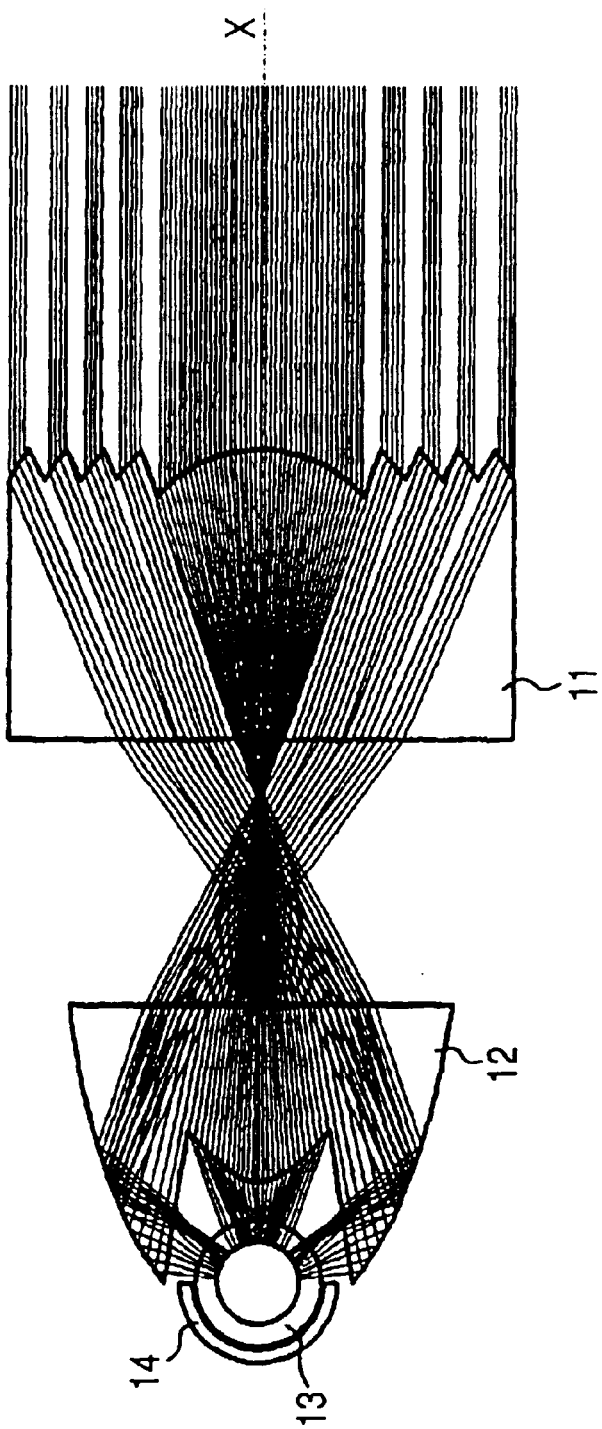
FIG. 5 is a cross-sectional view including the diametral direction of the discharge tube which shows the optical arrangement and the distribution of the rays of light of the original optical path of a Fresnel lens, of a beam travelling in a direction substantially parallel to the optical axis in the telephoto state of the illuminating apparatus.

FIG. 5 shows an optical path by the first Fresnel lens surface. As in the description of FIG. 2, the beam emitted from substantially the center of the light source can be emitted in a direction substantially parallel to the optical axis.

Figure 6:
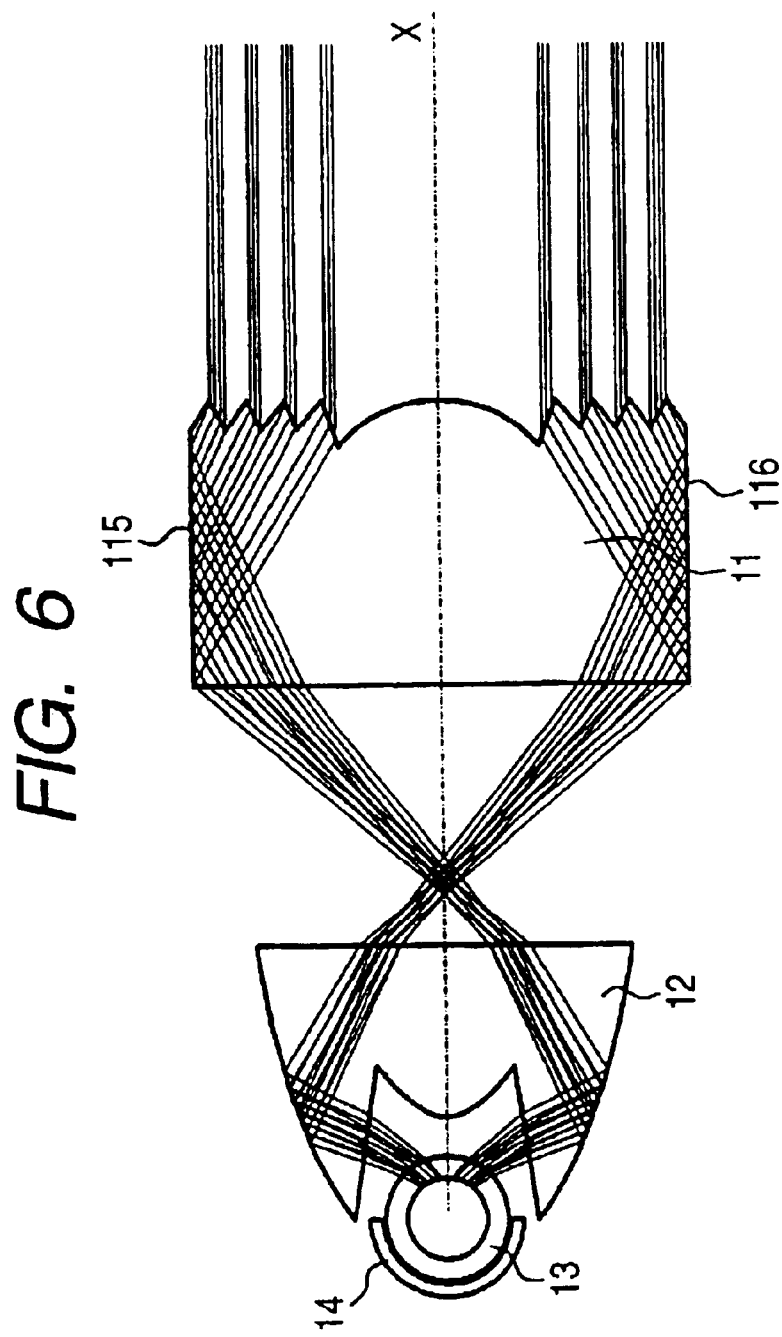
FIG. 6 is a cross-sectional view including the diametral direction of the discharge tube which shows the optical arrangement and the distribution of the rays of light of an optical path using total reflection, of a beam emitted substantially in parallelism to the optical axis in the telephoto state of the illuminating apparatus.

Next, what is shown in FIG. 6 is a condensing optical path using a reflecting surface which is one of the features of the illuminating apparatus according to the present embodiment. As described above, generally, in the telephoto state wherein the distance between the intermediate prism 12 and the front optical element 11 is long, the beam after condensed on the condensing area widens in the wide range of the front optical element 11. This is utilized to construct an optical system which in the telephoto state utilizes the sides 115 and 116 of the front optical element 11 as reflecting surfaces.

Also, although description cannot be made from only the ray trace view from the center of the light source, actually there exists a beam emitted from other portion than the vicinity of the central portion of the light source, and by effectively making the most of this beam, it is possible to effect more efficient irradiation. Particularly, the beam emitted forwardly from the central portion of the light source, as compared with the beam emitted from the vicinity of the central portion, tends to expand to a wider range, but according to the construction of the present embodiment, the beam which could not heretofore be sufficiently utilized in the optical arrangement in the telephoto state can be utilized effectively.

The details of this will be further described with reference to FIG. 6. It will be seen that a component emitted from a little forward of the center of the light source of the flashlight discharge tube 13 and having a relatively great angle with respect to the optical axis is totally reflected by sides 115 and 116 in the front optical element 11, and emerges from a second Fresnel lens surface in a Fresnel lens portion.

Namely, by this reflecting surface provided in a portion more peripheral than the Fresnel lens portion, the beam from the condensing area is reflected and is directed to the Fresnel lens portion. The beam directed to the Fresnel lens portion in this manner is subjected to such refracting action as condenses it relative to the beam incident on the reflecting surface (as viewed from the beam incident on the reflecting surface) by the second Fresnel lens portion.

Such an optical path is one which can be realized for the first time by the sides 115 and 116 of the front optical element 11 being made into reflecting surfaces. These reflecting surfaces are within an angle range which can sufficiently utilize total reflection, and can be realized without resulting in an extra increase in cost (such as the addition of special parts).

Also, these reflecting surfaces are ones formed by utilizing a relatively thick portion near the central portion of a cylindrical lens for effecting the condensing in the lengthwise direction of the discharge tube which will be described later, and enable this condensing in the lengthwise direction of the flashlight discharge tube to be effected and at the same time, can be utilized also as reflecting surfaces in the vertical direction and therefore, are good in space efficiency and convenient also as the construction of the optical system.

These reflecting surfaces can be discrete members as required, and in such case, reflecting members having reflecting surfaces can be disposed at locations similar to those of the reflecting surfaces 115 and 116 to thereby achieve a similar effect.

Here, description has been made of the optical path of the beam emitted form the front side of the center of the light source, but such a beam is never a singular one, and the actual light emitting points exist uniformly on substantially the whole surface of the inner diameter portion of the glass tube of the flashlight discharge tube. The beam emitted from the front side of the center of the light source which is used in the above-described optical path becomes weak in intensity as compared with the beam emitted from the vicinity of the central portion, but exists sufficiently, and the effect of making the most of this component is very great.

In fact, an optical system in which the above-described optical path is formed has been adopted, whereby the beam emitted substantially in parallelism to the optical axis could be increased by 15% to 20%. From this, it can be said that in such an optical system that the opening area of an emergence surface is limited, what has been described above is effective as a method of effecting illumination in which the loss of energy of the beam from the light source is suppressed to the utmost.

The amount of movement of the above-described optical system will now be described.

The amount of change in the position (the amount of movement) of the intermediate prism 12 (light source unit 1) relative to the front optical element 11 in the wide state and the telephoto state of the present embodiment is 2.5 mm. This amount of movement is very small as compared with that in the illuminating apparatus of the conventional type.

Also, if the amount of movement becomes smaller than this, a great change in the irradiation range will be obtained for a minute amount of movement, and the design of mechanism will become difficult, but it may be said that in the case of the level of the amount of movement as in the present embodiment, the dimensional relation is easiest to handle in the design of mechanism.

The changing of the irradiation range in the right and left direction (the lengthwise direction of the discharge tube 13) will now be described with reference to FIGS. 7 and 8. FIGS. 7 and 8 also show the ray trace views from the center of the discharge tube 13.

FIG. 7 shows the condensing state in the right and left direction in the wide state corresponding to FIG. 1. As shown in this figure, various shapes for effecting the changing of the irradiation range in the right and left direction are formed on the incidence surface side of the front optical element 11.

First, a cylindrical lens portion 111 is formed near the central portion of the optical axis. In the present embodiment, there is adopted a construction in which in the wide state, the intermediate prism 12 comes close to the front optical element 11, and in the telephoto state, the former becomes spaced apart from the latter and therefore, a strong condensing effect can be obtained in the telephoto state. From the ray trace views of FIGS. 7 and 8, it will be seen that the condensing power becomes stronger in the telephoto state than in the wide state.

Here, what is most characteristic regarding the condensing in the right and left direction is a prism portion formed on the outer side of the cylindrical lens portion 111 in the right and left direction. This prism portion is formed by incidence surfaces 115, 116 and inner reflecting surfaces 117, 118. The inner reflecting surfaces 117, 118 are set so as to satisfy a total reflection condition for the incident light from the incidence surfaces 115, 116. In the present embodiment, the position of the intermediate prism 12 in the direction of the optical axis relative to the front optical element 11 is changed from the wide state to the telephoto state to thereby change a beam area entering the prism portion from the incidence surfaces 115, 116, whereby great changing of the irradiation range in the right and left direction is made possible.

In the wide state shown in FIG. 7, the smallest beams of the beam emerging from the intermediate prism 12 which are near the right and left ends enter the prism portion and are condensed on the optical axis side, and the other beams are applied to a wide range by the cylindrical lens portion 111.

On the other hand, in the telephoto state shown in FIG. 8, the beams entering the prism portion become greatest. That is, rays of light enter the prism portion from substantially the whole of the incidence surfaces 115, 116. These beams are condensed on the optical axis side, and the other beams are applied to a narrow range by the cylindrical lens portion 111. Accordingly, sufficient condensing in the telephoto state is effected.

As described above, the condensing effect by total reflection in the vertical direction shown in FIGS. 1 and 2 is applied with respect also to the right and left direction, whereby in spite of a construction comprising a small number of parts, condensing can be effected very efficiently.

Figure 15:
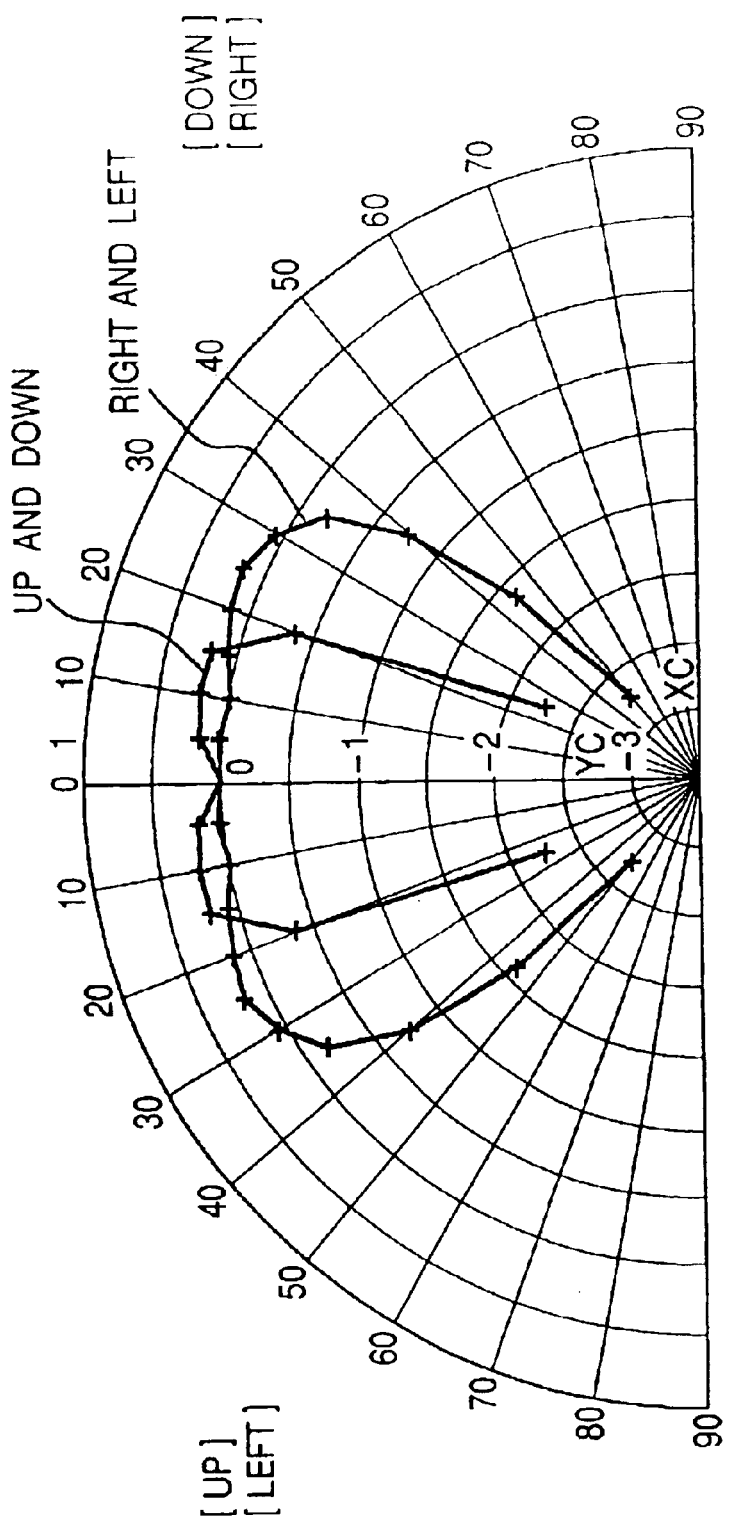
FIG. 15 shows the light distribution characteristic in the wide state of the illuminating apparatus.
Figure 16:
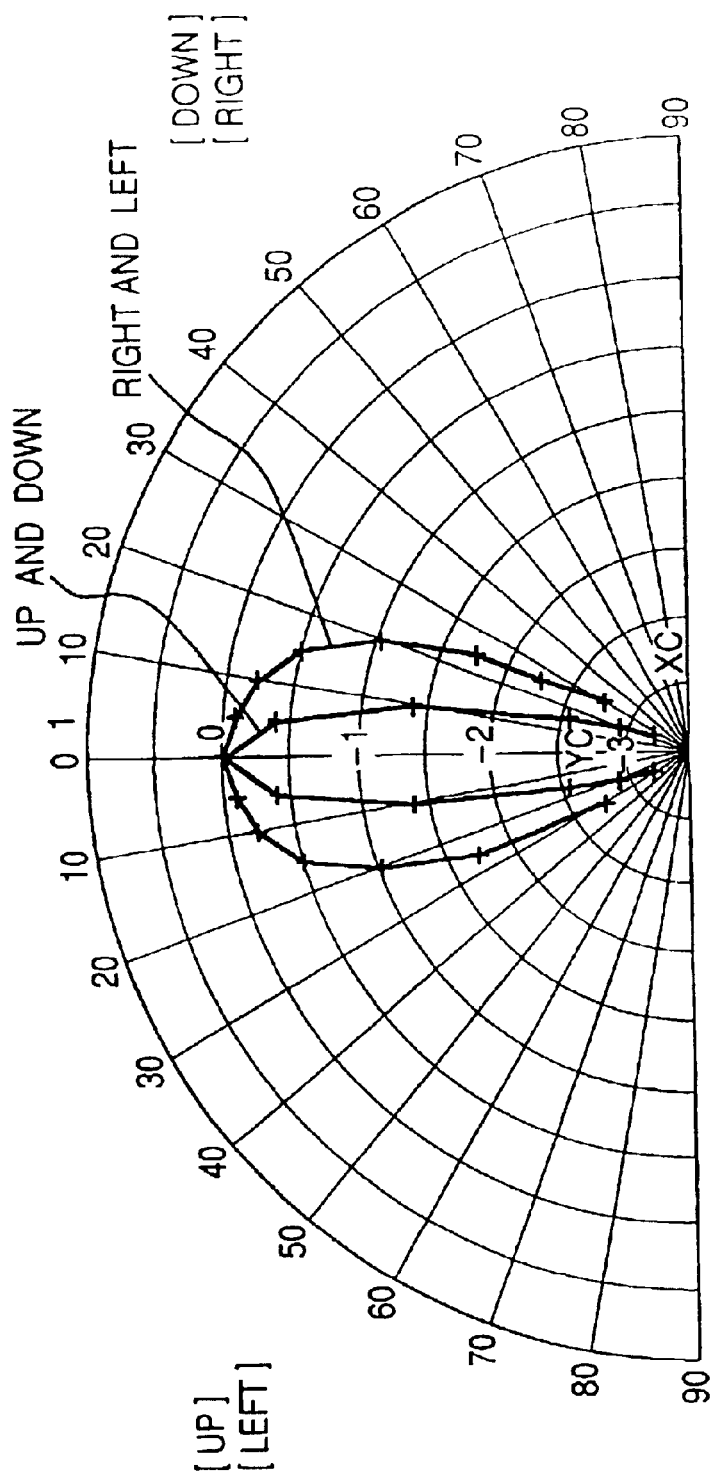
FIG. 16 shows the light distribution characteristic in the telephoto state of the illuminating apparatus.

The light distribution characteristic of the strobo apparatus constructed as described above is shown in FIGS. 15 and 16. FIG. 15 shows the light distribution characteristic in the up and down direction and the right and left direction in the wide state, and FIG. 16 shows the light distribution characteristic in the up and down direction and the right and left direction in the telephoto state. In both of these figures, the effective irradiation range prescribed by a quantity of light of 50% relative to the central quantity of light corresponds to a range indicated as −1.

As will be seen from these figures, by the illuminating apparatus being shifted from the wide state to the telephoto state, the irradiation range (angle) can be greatly changed from 83.6° to 39.4° with respect to the right and left direction, and from 44.8° to 16.9° with respect to the up and down direction.

Moreover, at this time, the light distribution is kept substantially uniform at any position, and it is possible to obtain a light distribution characteristic free of unevenness.

Further, the increase in the central quantity of light resulting from this change in the irradiation range amounts to double or greater, and the changing of the irradiation range can be achieved very efficiently.

As described above, in the present embodiment, in spite of the intermediate prism 12 (light source unit 1) being moved by only 2.5 mm relative to the front optical element 11, the irradiation range can be greatly changed in both of the up and down direction and the right and left direction and moreover, the light distribution characteristic is good and a great increase in guide number can be expected.

While the present embodiment has been described with respect to the illuminating apparatus of the variable irradiation range type, the present invention can also be applied to an illuminating apparatus of a fixed irradiation range type. In this case, it is also possible to give the same effect by utilizing not a construction in which as optical parts, two kinds of prisms, i.e., the intermediate prism 12 and the front optical element 11, are moved relative to each other, but a single prism.

Also, while the present embodiment has been described with respect to the strobo apparatus carried on a still camera, the present invention can also be applied to an illuminating apparatus used in a video camera or a photographing apparatus carried on a portable type information terminal.

Figure 17:
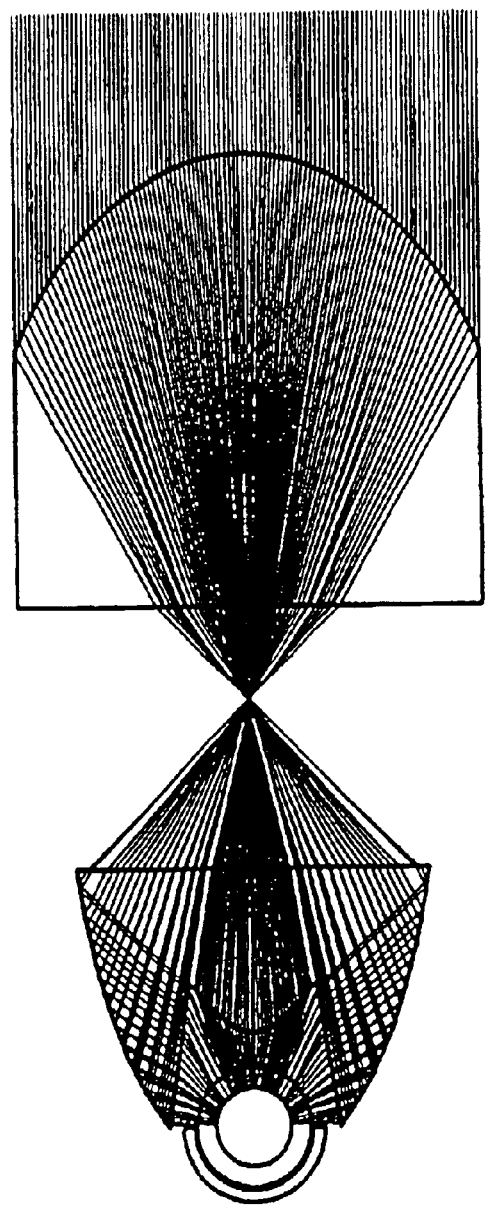
FIG. 17 is a view for illustrating an example of the cross-sectional shape of the emergence surface side of a front optical element 11.

It is desirable from the view point of the optical characteristic that the cross-sectional shape of the emergence surface side of the above-described front optical element 11 be all constituted by a cylindrical lens surface as shown, for example, in FIG. 17 (from this figure, it will be seen that on all surfaces of this emergence surface, there exist beams travelling in a direction substantially parallel to the optical axis), but if such a construction is adopted, refractive power is strong and therefore the sinkage (depression) of the shape of the peripheral portion becomes great (an extremely protruding portion or a depressed portion is created), and this is unsuitable for use as a front window constituting the appearance portion of a camera. Another disadvantage of this construction is that the full length of the optical system in the direction of the optical axis thereof becomes great. Consequently, as in the present embodiment, the appearance portion is constituted by two kinds of lens surfaces, i.e., a cylindrical lens surface forming the central portion having little sinkage and a Fresnel lens surface forming the peripheral portion, whereby the problem as noted above can be eliminated. FIG. 17 also shows the details of the cross-sectional shape of the emergence surface of the front optical element 11, and the existence area of beams travelling from the emergence surface of the front optical element 11 toward the optical axis.

As described above, according to the illuminating apparatus according to the above-described embodiment, in such an illuminating apparatus as uses a Fresnel lens on the emergence surface side thereof, an area originally not effectively functioning which is created in the edge portion of the Fresnel lens can be effectively utilized by the use of another optical path.

Moreover, in the illuminating apparatus according to the present embodiment, in the telephoto state wherein the irradiation angle range is narrow and high illuminance becomes necessary in the central portion, beams emerging from almost all areas of the emergence surface can be directed in a direction substantially parallel to the optical axis, and even in a limited opening area, the light from the light source can be utilized highly efficiently.

As described above, by adopting the construction in which the condensing action is imparted to both of a beam condensed (converged) from the light source onto substantially the optical axis (condensing area) and thereafter directly incident on the first Fresnel lens surface and a beam condensed on this condensing area and thereafter reflected by the reflecting surface and incident on the second Fresnel lens surface (i.e., a beam deviating to the outer peripheral side of the Fresnel lens portion), and both of these beams are utilized as illuminating light, whereby this can contribute to the downsizing of the illuminating apparatus in the diametral direction of the light source particularly the direction orthogonal to the optical axis).

Further, by adopting such a construction in which the condensing action is imparted to the beams from the light source by two optical parts, there can be provided an illuminating apparatus in which the number of constituent parts can be suppressed to a number smaller than in the prior art (that is, made simpler in construction) and yet the light from the light source can be efficiently utilized (the loss of energy is small).

Also, as compared with the conventional case where the illuminating apparatus is constituted by three optical parts, the number of optical parts is decreased to two, whereby it is difficult for the influence of the deviation or the like of the relative disposed position of the respective optical parts upon the optical characteristic to occur, and it becomes possible to enhance the stability and reliability of the optical characteristic.

Further, as compared with an illuminating apparatus having a size and an opening area similar to those in the prior art, there can be provided an illuminating apparatus of which the compactness, thinness and light weight have been achieved, and the energy from the light source can be utilized highly efficiently. Further, it becomes possible to provide a photographing apparatus such as an inexpensive still camera or video camera of simple construction using such an illuminating apparatus.

Also, the light source and the first optical member are disposed so as to be movable integrally with the second optical member in the direction of the optical axis so that the light application range may be changed by the movement of the light source and the first optical member, whereby the light source and the first optical member can be moved in conformity with the illuminating situation or a user's requirement or the like to thereby take proper steps to meet the situation so as to satisfy the required illuminating function.

As described above, according to the present invention, there can be provided an illuminating apparatus of simple construction which can efficiently utilize the light form the light source and can contribute to space saving, and a photographing apparatus provided with the same.

What is claimed is:

1. An illuminating apparatus comprising:

a light source;

a first optical unit disposed on the object side of the light source;

the first optical unit being provided with a lens portion having positive refractive power in the central portion thereof, incidence surfaces on which light from the light source is incident and reflecting surfaces for totally reflecting the light incident on the incidence surfaces, on both sides of the lens portion, and an emergence surface from which the light reflected by the reflecting surfaces emerges, wherein a beam emerging from the lens portion and a beam emerging from the emergence surface are condensed substantially at one point on the optical axis of the first optical unit; and a second optical unit disposed on the object side of the first optical unit, the second optical unit including a second lens portion having positive refractive power in the central portion thereof, and a plurality of prism portions having their convexity facing the object side on both sides of the second lens portion.

2. An illuminating apparatus according to claim 1, wherein the second optical unit is provided with a second reflecting surface for totally reflecting some of beam emerging from the first optical unit by the side thereof, and directing it to the plurality of prism portions, and the light reflected by the second reflecting surface of the second optical unit and directed to the plurality of prism portions travels in a direction substantially parallel to the optical axis of the second optical unit.

3. An illuminating apparatus according to claim 1, wherein when the angle formed by the optical axis side surface of the plurality of prism portions with respect to the optical axis is defined as θ, the following condition is satisfied:

$$10° < θ 35°$$

4. An illuminating apparatus according to claim 1, wherein the light source is a cylindrical light emitting tube, and the lens portion of the first optical unit is of a cylindrical lens shape of which the lengthwise direction is the same direction as the lengthwise direction of the light emitting tube.

5. An illuminating apparatus according to claim 1, wherein the light source is a cylindrical light emitting tube, and the lens portion of the first optical unit is of a cylindrical lens shape of which the lengthwise direction is the same direction as the lengthwise direction of the light emitting tube, and the second lens portion of the second optical unit also is of a cylindrical lens shape of which the lengthwise direction is the same direction as the lengthwise direction of the light emitting tube, and further, an apex of each of the prism portions of the second optical unit is parallel to the lengthwise direction thereof.

6. An illuminating apparatus according to claim 1, further comprising a member disposed at a location on the light source which is opposed to the first optical unit for reflecting the light from the light source.

* * * * *